United States Patent [19]
Keller

[11] 4,194,861
[45] Mar. 25, 1980

[54] COMPACT DOWEL HOLE SPACING AND DRILLING DEVICE

[75] Inventor: Russell E. Keller, Frostproof, Fla.

[73] Assignee: Keller Research & Development, Inc., Frostproof, Fla.

[21] Appl. No.: 862,644

[22] Filed: Dec. 20, 1977

Related U.S. Application Data

[63] Continuation-in-part of Ser. No. 678,711, May 4, 1976, abandoned.

[51] Int. Cl.² ............................................ B23B 49/02
[52] U.S. Cl. ................................. 408/109; 408/241 B
[58] Field of Search .................. 408/108, 109, 115 R, 408/115 B, 72 R, 72 B, 103, 107, 241 B

[56] References Cited

U.S. PATENT DOCUMENTS

| 10,092 | 10/1853 | Dean | 408/115 R |
|---|---|---|---|
| 1,161,479 | 11/1915 | Kelley | 408/109 |
| 1,269,811 | 6/1918 | Heritage | 408/109 |
| 3,062,076 | 11/1962 | Craig | 408/115 B |
| 3,708,237 | 1/1973 | Kruse | 408/115 R |
| 4,093,394 | 6/1978 | Adams | 408/103 |

*Primary Examiner*—Gil Weidenfeld
*Attorney, Agent, or Firm*—George B. Oujevolk

[57] ABSTRACT

A compact portable dowel hole spacing and drilling device has a rigid U-shaped base for receiving a workpiece to be drilled. Inner faces of the bright and a first leg of the base are flat and perpendicular to each other for facially receiving the workpiece which is clamped therein by a thumb-screw carried by a second leg opposite the first leg. A pair of standard drill guides are removably mounted in associated apertures in the bight of the base so that the longitudinal axes of the guides are parallel to each other and the face of the first leg. Opposite ends of the base are open so that opposite portions of the workpiece may extend through these open ends, and flat faces of the ends are parallel to each other and perpendicular to the face of the first leg, and are also parallel to and equally spaced from the adjacent one of the axes of the drill guides, so that corresponding inner edges of the end faces along the first leg and/or the bight serve to position the device for drilling of dowel holes in workpieces which are to be joined in abutting relationship with each other and have been previously provided with aligned marks parallel to the desired dowel holes. Thus, in drilling parallel pairs of hole in the workpieces, one of the positioning edges is aligned with one of the marks, the device clamped to the workpiece and the holes drilled, and then the opposite positioning edge is aligned with the mark on the other workpiece, the device clamped in place and the holes drilled.

5 Claims, 7 Drawing Figures

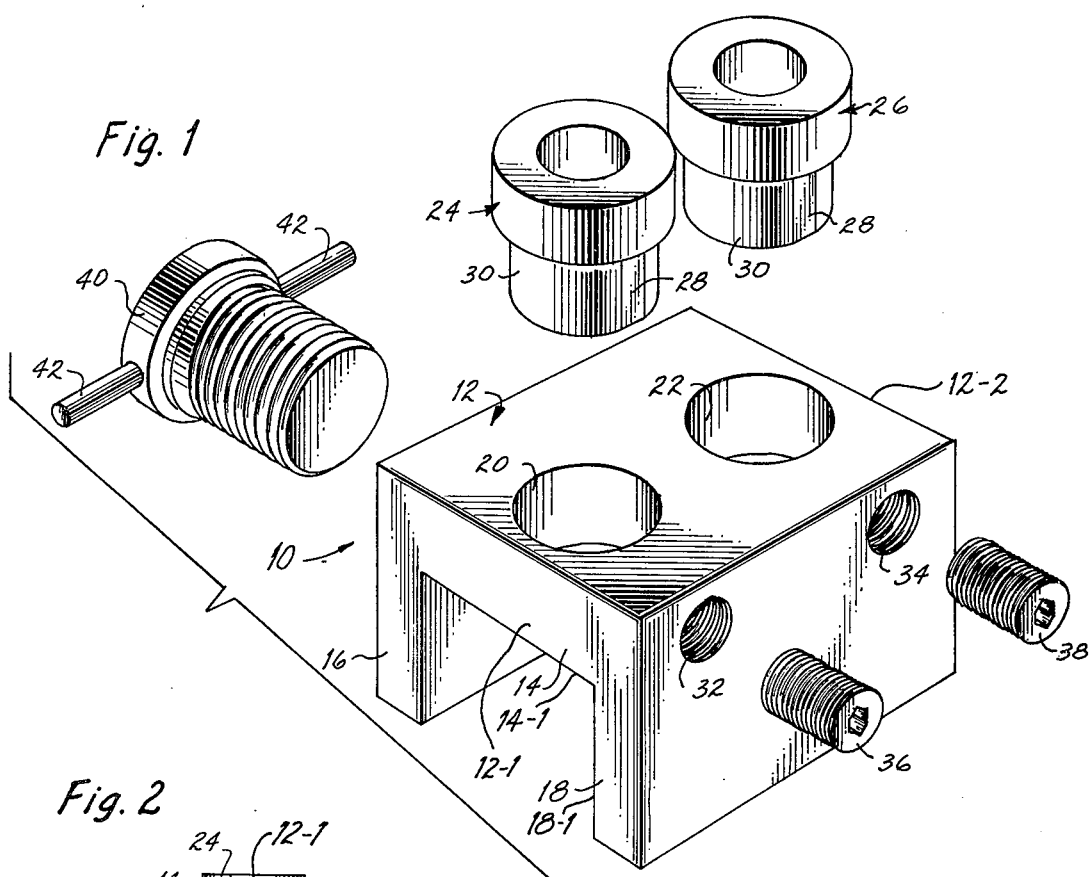
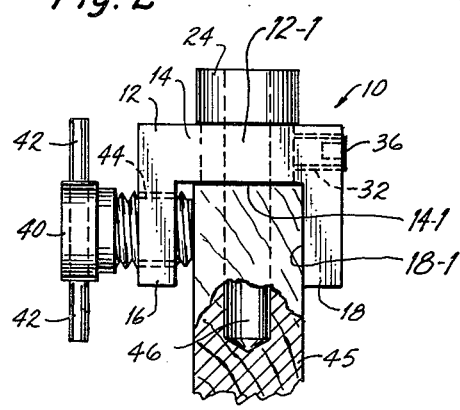
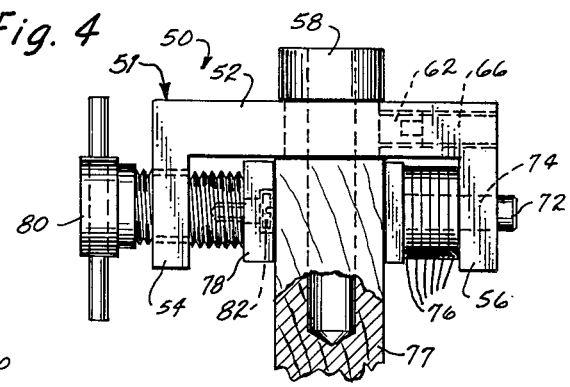
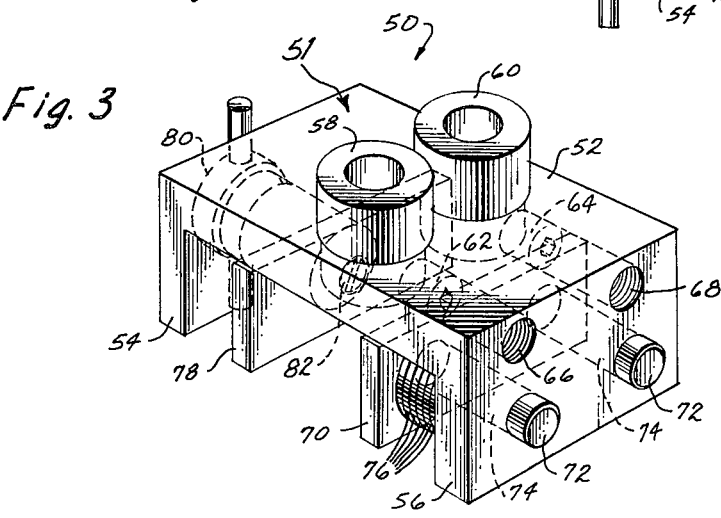

COMPACT DOWEL HOLE SPACING AND DRILLING DEVICE

This application is a continuation-in-part of my co-pending application Ser. No. 678,711, filed May 4, 1976, now abandoned and hereby incorporated by reference.

This invention pertains to a dowel hole drilling device and, more particularly, to such a device which is both compact and portable, and particularly suited for drilling of parallel pairs of holes in workpieces to be joined to each other.

BACKGROUND OF THE INVENTION

Various types of devices, such as jigs and gauges, for use in drilling holes are well know, and numerous such devices are shown in the following United States Letters Patent: Nos.

| | | |
|---|---|---|
| 3,914,871 | 2,838,966 | 1,809,768 |
| 3,708,237 | 2,804,788 | 1,161,479 |
| 3,557,641 | 2,798,520 | 952,968 |
| 3,019,675 | 2,761,476 | 917,488 |
| 2,987,944 | 2,651,951 | 581,811 |
| 2,930,263 | 2,535,450 | 10,092 |
| 2,928,441 | 2,268,930 | Des. 160,734 |

While some of the patents show devices having a pair of fixed drill guides, such patents are apparently devoid of any teaching of a device for positioning the guides for drilling parallel pairs of aligned holes in members to be joined to each other, a problem being that in order to position the device properly on the two members there must be corresponding positioning parts on opposite ends of the device, as will become apparent hereinafter.

It is a feature of this invention to provide a device adapted to be releasable secured in fixed position on a first workpiece and then on a second workpiece, the device having corresponding and opposite end positioning portions to be alternately positioned aligned with markings aligned on the workpieces and parallel to the desired axes of the holes to be drilled in the workpieces, the markings being in alignment when the workpieces are laid-out in the orientation in which it is desired that they be joined. Another feature is the device utilizing standard pairs of drill guides of various sizes, the guides being releasable and interchangable in the device.

It is a primary object of this invention to provide a new and useful compact portable dowel hole spacing and drilling device for drilling of parallel pairs of aligned dowel holes in workpieces to be joined to each other, the workpieces having aligned markings in the desired position of joining, and the device having opposite but corresponding positioning portions, one for alignment with the aligned marking on one of the workpieces and the other for alignment with the marking on the other workpiece. A related object is provision of such a device having a U-shaped, rigid base with inner faces of the bight and one of the legs having flat faces perpendicular to each other, the bight having provision for releasably mounting drill guides having their longitudinal axes parallel to each other and to the face of the first leg and equally spaced from this leg, and the positioning portions being on opposite open ends of the U-shaped base and in planes in parallel to each other and perpendicular to the face of the first leg. A further related object is provision on the second leg for clamping the device on the workpiece.

The invention, in brief, is directed to a device adapted to be clamped to a workpiece and when so clamped having provision for guiding a drill in drilling a pair of holes in the workpiece. The device has a rigid U-shaped base with inner faces of the bight and a first leg perpendicular to each other, the base having opposite open end faces so that the workpiece may extend therethrough, and the end faces having provision for positioning the base with axes of adjacent positions for drilling the workpiece equally spaced from the adjacent end. These axes are parallel to each other and to the inner face of the first leg, and are equally spaced from this face. The second leg of the U-shaped base has provision for clamping the device to the workpiece.

These and other features and advantages of the invention will become apparent from the following description and the accompanying drawings.

BRIEF DESCRIPTION OF THE DRAWINGS

FIG. 1 is an exploded, perspective view of a preferred embodiment of the invention.

FIG. 2 is an assembled end view of the device illustrated in FIG. 1, with the device operatively positioned on a workpiece;

FIG. 3 is a perspective view of another embodiment of the invention;

FIG. 4 is an end view, similar to FIG. 2, but of the device shown in FIG. 3;

DESCRIPTION OF THE ILLUSTRATED EMBODIMENTS

Figure 5:
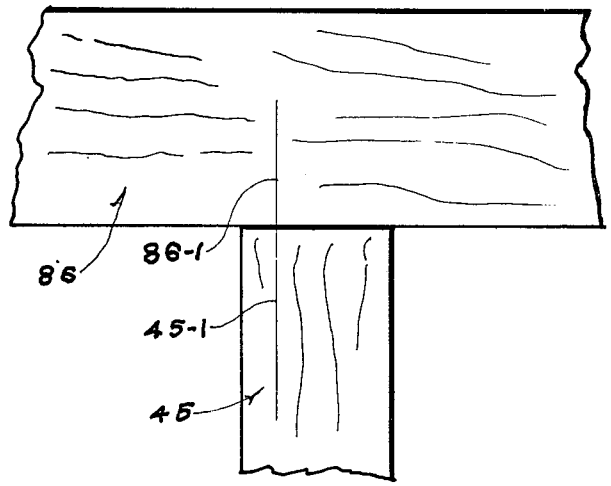
FIG. 5 is a fragmentary, plan view of a pair of workpieces laid-out in a desired position for joining thereof.

Referring first to the dowel hole spacing and drilling device illustrated in FIGS. 1 and 2, the device 10 has a rigid, U-shaped body or base 12 having a bight 14 and extending perpendicularly therefrom facially opposed legs 16 and 18. A pair of apertures 20 and 22 extend through the bight 14 and open between the legs 16 and 18. Standard drill guides 24 and 26 are provided for the apertures 20 and 22, respectively, each guide having a flat 28 along a shank 30 snugly received in the associated aperture and fixed in operative position by one of a pair of allen-head set screws 36 or 38 received in threaded holes 32 and 34, respectively, in the base 12 and tightened against the flats 28 of the drill guides 24 and 26, respectively. Thus, the drill guides 24 and 26 are removable so that other guides for different drill sizes may be installed at will. However, as will become apparent later, only guides with the same drill size should be used at the same time. A pressure-bearing thumb-screw 40 with wings 42 is inserted into a threaded hole 44 in the leg 16 and may be tightened against a workpiece 45, as illustrated in FIG. 2, for drilling holes, as 46, into the workpiece. The base is preferably aluminum, the guides steel.

An embodiment for accepting workpieces of considerably different thickness is illustrated in FIGS. 3 and 4, wherein a spacing and drilling device 50 has a U-shaped body or base 51 with a bight 52 and legs 54 and 56, generally as previously described. Also as previously described, standard drill guides 58 and 60 are received in apertures in the bight 52 and are releasably retained in operative position by set-screws 62 and 64, respectively, received in threaded holes 66 and 68, respectively. A plate 70 has two fixed alignment pins 72 telescopically slidable in holes 74 in the leg 56, for movement of the plate 70 in a direction parallel to the bight 52. As required, one or more washers 76 may be mounted on the pins 72 (an equal number on each pin) in order to position the workpiece 77 in the device 50. A pressure plate 78 of a thumb screw 80 threadedly received in a hole in the leg 54, is pivoted, as by a loose fitting screw 82, for clamping the workpiece against the plate 70.

In using a device of the previously described nature, a workpiece, as 45 (FIG. 2) is end abutted against a side of another workpiece 86 as illustrated in FIG. 5. Alignment marks 45-1 and 86-1 are provided on the workpieces 45 and 86, respectively, in alignment with each other and parallel to the desired axes of the holes to be drilled into the workpieces, the axes normally being parallel to the side of the end abutting workpiece 45. The alignment mark 45-1 may be the side edge of workpiece 45 when the distance between opposite open end faces 12-1 and 12-2 (FIGS. 1, 2 and 6) of the base 12 are spaced apart a distance equal to the width of the workpiece 45 (one-and-five-eigths-inches is a standard in lumber).

Figure 6:
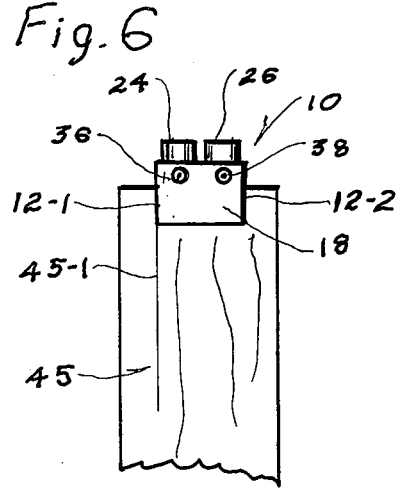
FIG. 6 is a plan view, similar to FIG. 5, with the device of FIGS. 1 and 2 operatively mounted ready for drilling of a pair of holes in one workpiece.
Figure 7:
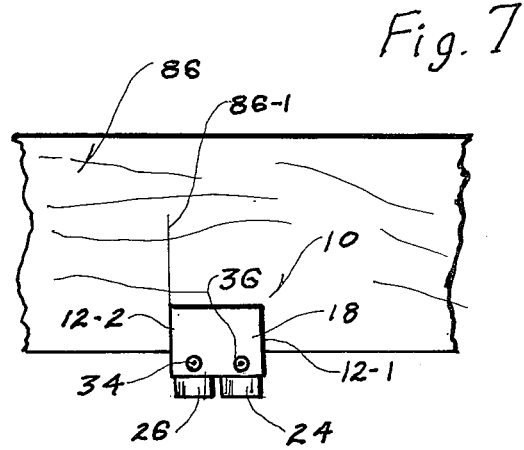
FIG. 7 is a plan view similar to FIG. 6, but with the device of FIGS. 1 and 2 operatively mounted on the other workpiece for drilling therein of holes aligned with the holes in the companion workpiece.

The workpieces 45 and 86 are now separated and the device, as 10 (FIGS. 1 and 2), for example, is positioned on either workpiece. As shown in FIG. 6, the device is positioned over the end face of workpiece 45 with base end face 12-1 aligned with the mark 45-1 on workpiece 45 and, with the end face of the workpiece seated against the bight 14 (FIGS. 1 and 2), the thumb-screw 40 is tightened against the workpiece to clamp it against the leg 18. A suitable drill (not shown) is then inserted into a first of matching drill guides, as 24, to drill the hole 46 (FIG. 2), and then into the other guide 26 to drill the other hole.

Next, the device 10 is removed from the workpiece 45 and is inserted onto the side of the workpiece 86, base end face 12-2 is aligned with the alignment mark 86-1, and with the workpiece side seated against the bight 14 (FIGS. 1 and 2) of base 12, the thumb-screw 40 is tightened to clamp the marked face of the workpiece 86 against the leg 18 of the base.

It should be noted that both end faces 12-1 and 12-2 are required for proper alignment of the device 10 with the alignment marks 45-1 and 86-1, respectively. Thus, the geometry of the spacing and drilling device is important.

Therefore, referring again to FIGS. 1 and 2, an inner face 14-1 of the bight 14 is flat and is perpendicular to a flat inner face 18-1 of the (first) leg 18 of the U-shaped base 12. The base end faces 12-1 and 12-2 are parallel to each other and are perpendicular to the faces 14-1 and 18-1. The apertures 20 and 22 are so oriented in the bight 14 that the longitudinal axes of the drill guides 24 and 26 (as well as the axes of the apertures) are parallel to each other and to the face 18-1 and perpendicular to the face 14-1, and each of the drill guide axes are equally spaced from the adjacent one of the end faces 12-1 and 12-2 (as measured in a common axial plane of the axes and along the face 14-1). In other words, the faces 12-1 and 12-2 are equidistant from the axes of the drill guides 24 and 26, respectively. The longitudinal axes of the drill guides 24 and 26, as well as the axes of the apertures 20 and 24, are similarly equally spaced from the inner bight face 18-1.

In practice, the inner edges of the leg 18, which are coplanar with the face 18-1, serve as positioning edges for more accurate positioning of the device than would the faces 12-1 and 12-2. Similarly, the inner edges of the bight 14, which are coplanar with the inner flat face 14-1 of the bight, may serve as positioning edges, should such be necessary.

Similar geometry is found in the embodiment of FIGS. 3 and 4, and the inner end edges of the plate 70 are aligned with the end faces of the base 51 and serve as positioning edges, as may the inner end edge of the bight 52.

In both embodiments, the axis of the thumb-screw 40 or 80 is preferably perpendicular to the inner face 18-1 (FIGS. 1 and 2) or the inner face of the plate 70, respectively.

While this invention has been described and illustrated with reference to particular embodiments in a particular environment, various changes may be apparent to one skilled in the art, and the invention is therefore not to be limited to such embodiments or environment except as set forth in the appended claims.

What is claimed is:

1. A compact portable dowel hole spacing and drilling device for drilling of parallel pairs of aligned dowel holes in workpieces to be joined to each other and having aligned means in the desired position of joining of the workpieces, the device comprising, a rigid U-shaped base for receiving therein the workpieces, one workpiece at a time, said base including a bight and first and second opposed legs extending in the same general direction therefrom, and said base further having unobstructed open ends for receipt of the workpiece with opposite portions of the workpiece extending outwardly from said ends when first and second faces of the workpiece are in facial engagement with flat perpendicular inner faces of a first of said legs and said bight, respectively, means for guiding a drill along parallel longitudinal axes of apertures extending through said bight and opening between said legs, said axes being equally spaced from the face of the first leg so that the dowel holes are drilled always spaced the same distance from said face of said first leg, said drill guiding means including drill guides positioned in said bight, one for each of said apertures, and means for releasably retaining said drill guides in operative position in the respective apertures for drilling the holes, said retaining means including set screws insertable into threaded bores formed in said first leg for clamping the associated drill guides in operative position in the associated apertures, the second leg having means for clamping the workpiece against said face of said first leg, and said ends having positioning edges coplanar with said face of said first leg and parallel to and equally spaced from adjacent ones of said axes, for alignment of one of said edges with the alignment means of one of the workpieces and the other of said edges for alignment with the alignment means of the other of said workpieces, so that the dowel holes in each workpiece are drilled in correct position for joining the workpieces in precise position as indicated by the aligned means on the workpieces.

2. A device as set forth in claim 1 in which said drill guides are standard drill guides having standard shanks of the same size regardless of the size of the drill size.

3. A device as set forth in claim 1 in which the clamping means is a thumb-screw threadedly received in the second leg and substantially axially perpendicular to said face of said first leg.

4. A device as set forth in claim 1 in which said ends of said base are flat end faces of the base, said end faces being parallel to each other and perpendicular to said face of said first leg.

5. A device as set forth in claim 4 in which the drill guiding means includes standard drill guides, one for each of said apertures, said drill guides having standard shanks of the same size regardless of the size of the drill size of the guide.

* * * * *